United States Patent
Edlund et al.

(10) Patent No.: US 7,099,344 B2
(45) Date of Patent: Aug. 29, 2006

(54) MULTIPLE DIALOGUES ON CONNECTION-ORIENTED TCAP TRANSACTION

(75) Inventors: Peter Edlund, Tumba (SE); Anders Jönsson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 970 days.

(21) Appl. No.: 10/066,932

(22) Filed: Feb. 4, 2002

(65) Prior Publication Data
US 2003/0147418 A1   Aug. 7, 2003

(51) Int. Cl.
*H04L 12/28* (2006.01)
(52) U.S. Cl. .................. 370/426; 370/467
(58) Field of Classification Search ......... 370/426, 370/467
See application file for complete search history.

(56) References Cited

U.S. PATENT DOCUMENTS

| | | | | |
|---|---|---|---|---|
| 6,047,059 A * | 4/2000 | Lin et al. | ...................... | 379/230 |
| 6,577,723 B1 * | 6/2003 | Mooney | ................. | 379/221.08 |
| 6,628,672 B1 * | 9/2003 | Cabello | ....................... | 370/474 |
| 6,668,051 B1 * | 12/2003 | Ashdown et al. | ....... | 379/221.08 |
| 6,940,866 B1 * | 9/2005 | Miller et al. | ................. | 370/426 |

* cited by examiner

*Primary Examiner*—Hassan Kizou
*Assistant Examiner*—Anthony Sol (57) ABSTRACT

In a method and system for improving the efficiency of TCAP transactions, a TCAP transaction is set up in a semi-permanent basis between two signaling points having frequent request-reply communication. The semi-permanent TCAP transaction is thereafter used for application dialogues between the two signaling points. Multiple application dialogues may be multiplexed in one TCAP transaction. Alternatively, multiple TCAP transactions may be multiplexed in one SCCP connection.

16 Claims, 8 Drawing Sheets

MULTIPLE DIALOGUES ON CONNECTION-ORIENTED TCAP TRANSACTION

BACKGROUND OF THE INVENTION

1. Field of the Invention

The present invention relates to Transaction Capabilities Application Part (TCAP) in Signaling System No. 7 (SS7) networks and, more particularly, to a method and system for improving the efficiency of the TCAP transactions.

2. Description of the Related Art

Modern telecommunication systems use an infrastructure that includes two related, but separate networks: a bearer network and a signaling network. Briefly, the bearer network carries the actual end-user voice and data traffic, while the signaling network carries the control signals that set up and release the connections in the bearer network. The signaling network uses a global signaling standard called Signaling System No. 7, or SS7, established by the International Telecommunication Union Telecommunication Standardization Sector (ITU-T). SS7 defines the procedures and protocols by which information is exchanged over the signaling network. Within an SS7 signaling network is a plurality of interconnected signaling points including service switching points (SSP), service transfer points (STP), and service control points (SCP).

Service switching points are switches that originate, terminate, or tandem calls. A service switching point sends signaling messages to other service switching points to setup, manage, and release voice circuits in the bearer network that are required to complete a call. In some cases, the service switching point may send a signaling message such as a query to the service control points.

Service control points are centralized databases or repositories of information that contain network and service information. In response to a query message, the service control point may send a message to the originating service switching point including the routing number(s) associated with the dialed number.

Service transfer points are packet switches that route network traffic between the signaling points. The service transfer points act as network hubs to provide improved utilization of the network by eliminating the need for direct links between the signaling points.

When a call is placed, the origination signaling point (typically a service switching point) sends a setup message over the signaling network to the destination signaling point to set up the call. The setup message may be routed over several intermediate signaling points (e.g., signal transfer points, signal control points) in the signaling network before arriving at the destination signaling point. Once the setup messages have been exchanged, the actual voice and data traffic for the call is then carried on voice and data channels in the bearer network. Such out-band signaling has a number of advantages, including faster call setup times (compared to in-band signaling), more efficient use of voice and data channels, support for Intelligent Network (IN) services, and generally improved security and reliability over the whole system.

In some cases, the origination signaling point may send a query to the centralized database to determine how to complete the call. Such queries may be needed, for example, to complete wireless calls (e.g., to locate the mobile unit and to authenticate subscriber information), to connect toll-free (800/888) and toll (900) calls, to carry out enhanced call features such as call forwarding, caller ID, and other Intelligent Network services. The database may respond by sending the routing numbers associated with the desired call over the signaling network back to the origination signaling point. The routing numbers allow the origination signaling point to connect the appropriate circuits in the bearer network that will correctly complete the call.

Each signaling point in the network is uniquely identified by a numeric point code. The point codes are carried in the signaling messages that are exchanged between the signaling points to identify the source and destination of each message. Based on the point codes, each signaling point selects the appropriate signaling path for each message from a routing table.

A procedure called global title translation (GTT) is used to derive the point codes from the signaling messages. Global title translation determines, for example, the Destination Point Code (DPC) from the digits present in the signaling message (e.g., the dialed 800 number, calling card number, or mobile subscriber identification number).

Figure 1:
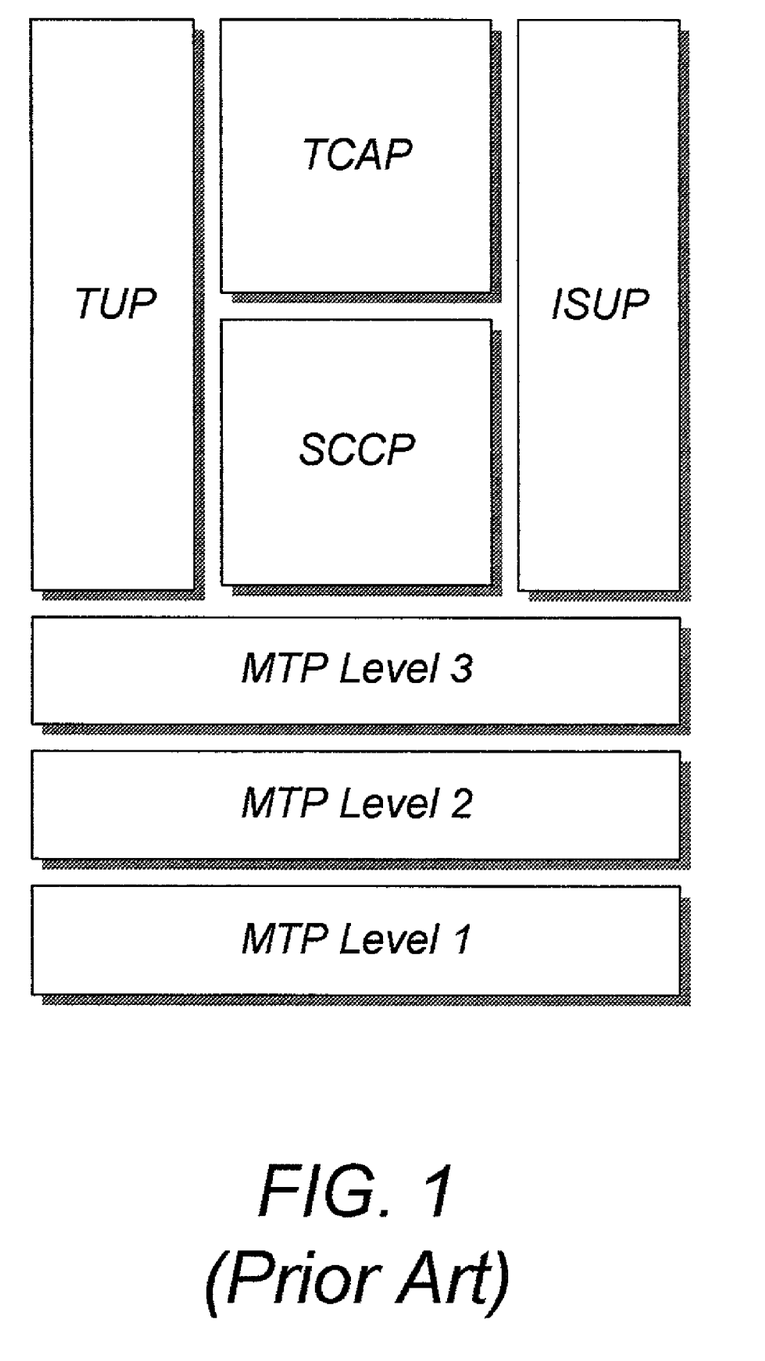
FIG. 1 illustrates an SS7 protocol stack.

A graphical illustration of the SS7 protocol stack is illustrated in FIG. 1, where it can be seen that the SS7 protocol is divided into several abstract layers or levels. The first three levels define the Message Transfer Part (MTP) that makes it possible to transfer the control signals and messages in the signaling network. The lowest level, MTP level 1, defines the physical, electrical, and functional characteristics of the digital signaling links that connect the various signaling points or nodes in the signaling network together. MTP level 2 ensures accurate end-to-end transmission of a message across a signaling link including such things as flow control, message sequence validation, and error checking. MTP level 3 provides message routing between signaling points or nodes in the SS7 signaling network including re-routing traffic away from failed links and signaling points and generally controlling the signaling traffic when congestion occurs.

The ISDN User Part (ISUP) defines the protocol used to set up, manage, and release trunk circuits that carry voice and data calls over the public switched telephone network (PSTN). ISUP is used for both ISDN and non-ISDN calls. However, calls that originate and terminate on the same service switching point do not use ISUP.

The Signaling Connection Control Part (SCCP) is the transport layer for queries and service requests sent from one signaling point to another. Specifically, an SCCP connection allows messages to be addressed to specific applications at the signaling points. Each SCCP connection has a unique connection identification (CID) that is associated therewith. There are generally two types of SCCP connections: connectionless and connection-oriented.

In connectionless SCCP connections, the SCCP message does not follow a specific path, but is instead routed through the network on a signaling point to signaling point basis. Each query or service request transported on a connectionless SCCP connection requires a new SCCP connection be set up and a full SCCP routing address be used. Furthermore, global title translation is performed at each intermediate signaling point along the path.

In connection-oriented SCCP connections, the SCCP message follows a specific path defined by a logical SCCP connection. Each intermediate signaling point retains the CID of the connection and the destination point code (DPC), which is the result of global title translation. Thus, no global title translation is needed at the intermediate signaling point.

One type of message transported by an SCCP connection is a Transaction Capabilities Application Part (TCAP) message. TCAP messages are usually transported using connectionless SCCP connections. Such TCAP messages enable the deployment of advanced services such as IN services by allowing information related to the services to be exchanged between signaling points. For example, an origination signaling point (e.g., a service switching point) may use a TCAP message to query a central database (e.g., a service control point) for information regarding a toll-free call, a calling card call, a local number portabability call, and other similar services.

More importantly, TCAP messages may be used to support mobile communication systems such as the second and third generations of the Global System for Mobile Communication (GSM). The TCAP messages may be sent between mobile switching centers (MSC) and the databases associated therewith to support mobile services such as user authentication, equipment identification, and roaming. For example, when a mobile communication device (e.g., a cell phone) roams outside of its home network, it registers with a foreign network in order to continue receiving mobile services. The mobile communication device typically sends its mobile subscriber identification number to the foreign network, specifically to the visitor location register (VLR) thereof. The foreign network thereafter sends a TCAP message to the home network, specifically to the home location register (HLR) thereof. The TCAP message includes a request for authentication of the mobile communication device and any subscription information therefor. For mobile communication systems, such as GSM and UMTS, the request is based on the mobile applications part (MAP/TCAP) protocol. The home network then responds by sending a TCAP message including the result back to the foreign network to authenticate the mobile communication device.

Figure 2:
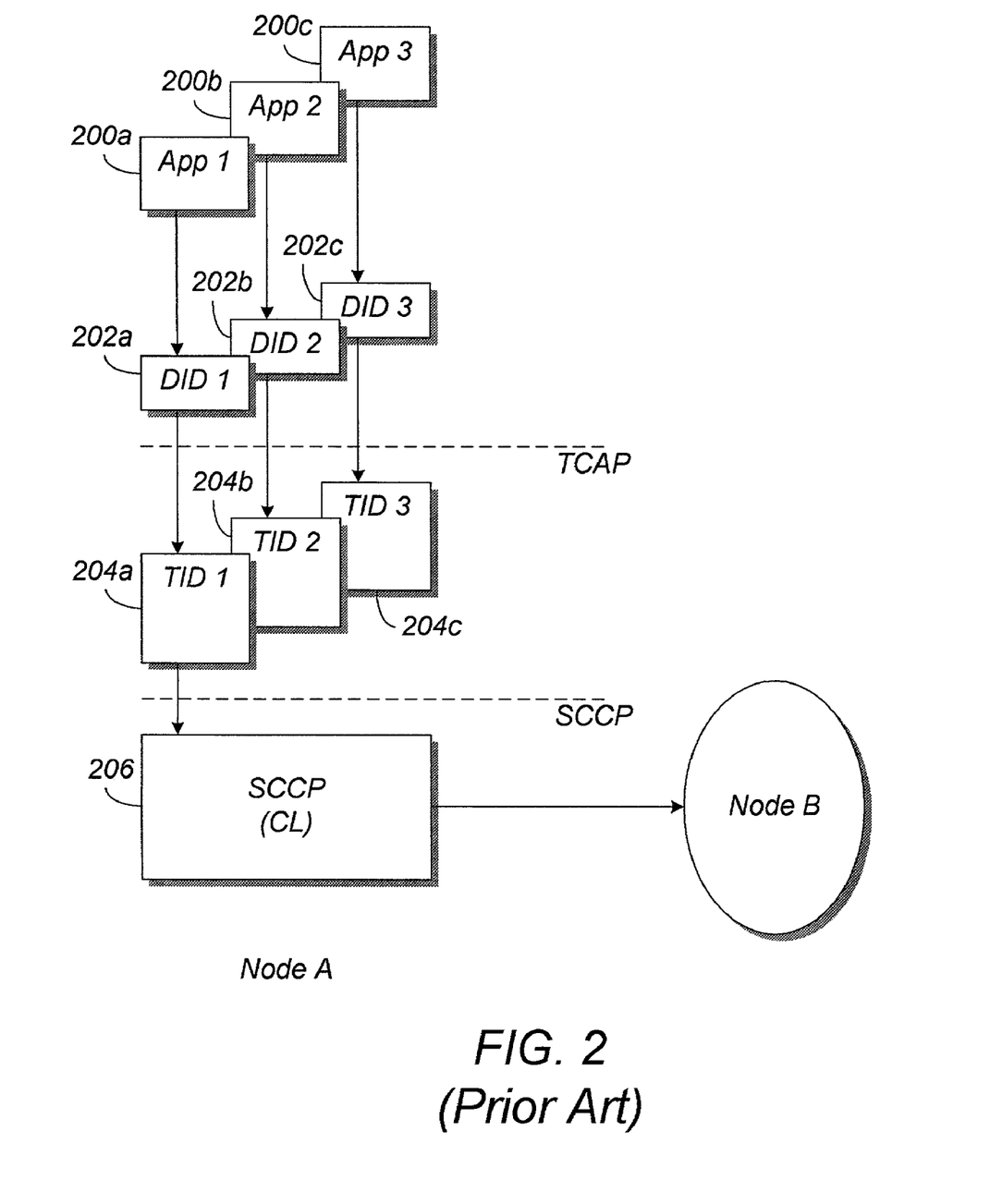
FIG. 2 illustrates a prior art method of setting up a TCAP transaction.

One or more related TCAP messages are sent as part of a TCAP transaction between two signaling points. When a signaling point wishes to query another signaling point, it initiates a TCAP transaction with the second signaling point. Thereafter, the first signaling point uses that TCAP transaction to send TCAP messages related to that query to the second signaling point. Likewise, the second signaling point also initiates a TCAP transaction with the first signaling point to send TCAP messages related to the query back to the first signaling point. FIG. 2 illustrates in more detail the process of setting up a TCAP transaction from one signaling point, Node A, to another signaling point, Node B.

When an application 200a–c at Node A wishes to query another application at Node B, it initiates an application dialogue 202a–c. Examples of application dialogues 202a–c may include file transfer operations, equipment authentications, database inquiries, and the like. Each application dialogue 202a–c has a different dialogue identification (DID) that distinguishes the various application dialogues 202a–c from one another. At the TCAP layer, a TCAP transaction 204a–c is set up for each application dialogue 202a–c, and a different transaction identification (TID) is assigned to each TCAP transaction 204a–c. During the setup process, global title translation is performed for each TCAP transaction 204a–c to determine the DPC of the receiving node, for example, Node B.

In presently available telecommunication systems, there is one application dialogue 202a–c per TCAP transaction 204a–c, and there is no distinction between the application dialogues 202a–c and the TCAP transactions 204a–c. In other words, the DID becomes part of the TID. The length of the TID, however, limits the number of TCAP transactions 204a–c and, hence, the number of application dialogues 202a–c that are available to concurrent applications 200a–c.

Accordingly, it is desirable to be able to provide a way to improve the efficiency of TCAP transactions.

SUMMARY OF THE INVENTION

The present invention is related to a method and system for improving the efficiency of TCAP transactions. A TCAP transaction is set up in a semi-permanent basis between two signaling points having frequent request-reply communication. The semi-permanent TCAP transaction is thereafter used for application dialogues between the two signaling points. Multiple application dialogues may be multiplexed in one TCAP transaction. Alternatively, multiple TCAP transactions may be multiplexed in one SCCP connection.

In general, in one aspect, the invention is related to a method of setting up a TCAP transaction in an SS7 signaling network. The method comprises the steps receiving multiple application dialogues in the SS7 signaling network, establishing at least one TCAP transaction in the SS7 signaling network, multiplexing the multiple application dialogues in the at least one TCAP transaction, and transporting the at least one TCAP transaction in the SS7 signaling network using a connection-oriented Signaling Connection Control Part (SCCP) connection.

In general, in another aspect, the invention is related to a server for setting up a TCAP transaction in an SS7 signaling network. The server comprises a storage unit configured to store a signaling module therein, and a processing unit connected to the storage unit and configured to execute the signaling module. The signaling module causes the server to receive multiple application dialogues from the SS7 signaling network, establish at least one TCAP transaction in the SS7 signaling network, multiplex the multiple application dialogues in the at least one TCAP transaction, and transport the at least one TCAP transaction in the SS7 signaling network using a connection-oriented Signaling Connection Control Part (SCCP) connection.

In general, in yet another aspect, the invention is related to a method of setting up a Transaction Capabilities Application Part (TCAP) transaction in an SS7 signaling network. The method comprises the steps of receiving a plurality of application dialogues in the SS7 signaling network, establishing a TCAP transaction for each application dialogue, and multiplexing the TCAP transactions in a connection-oriented Signaling Connection Control Part (SCCP) connection.

BRIEF DESCRIPTION OF THE DRAWINGS

A more complete understanding of the present invention may be had by reference to the following detailed description when taken in conjunction with the accompanying drawings, wherein.

DETAILED DESCRIPTION OF THE DRAWINGS

Following is a detailed description of the drawings wherein reference numerals for the same and similar elements are carried forward.

As mentioned previously, embodiments of the invention provide a method and system for improving the efficiency of TCAP transactions. In some embodiments, a semi-permanent TCAP transaction is set up between signaling points experiencing a high degree of request-reply communication. For these embodiments, connection-oriented SCCP signaling is used for the TCAP transactions. Furthermore, multiple application dialogues are multiplexed in one TCAP transaction. Alternatively, multiple TCAP transactions may be multiplexed in one connection-oriented SCCP connection.

Figure 3A:
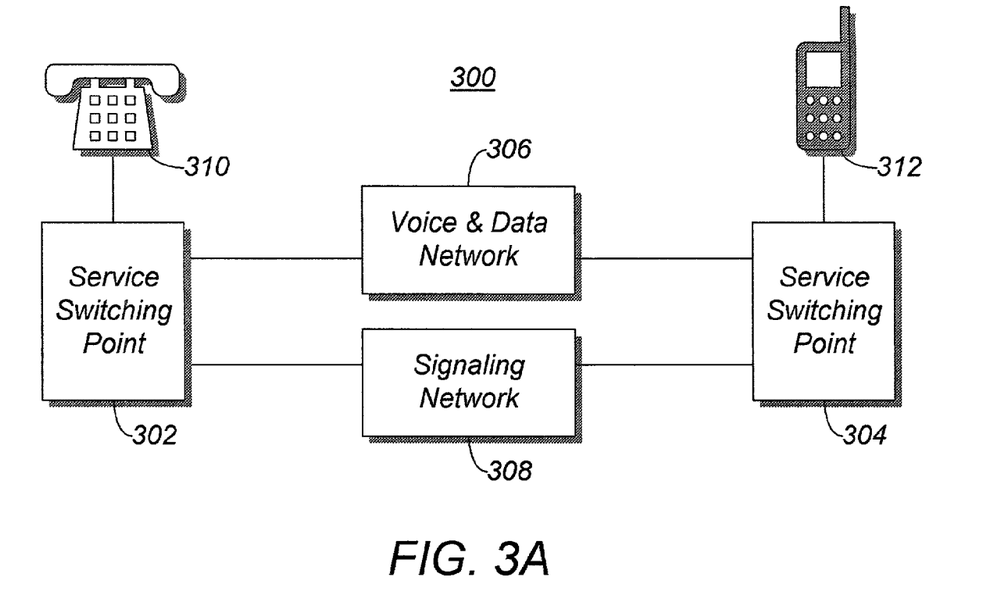
FIGS. 3A–3B illustrate a telecommunication system according to some embodiments of the invention.

Referring now to FIG. 3A, a telecommunication system 300 according to some embodiments of the invention is shown. The telecommunication system 300 includes a plurality of service switching points 302 and 304. Although only two service switching points are shown, it will be understood that the telecommunication system 300 can include any number of service switching points 302 and 304. The service switching points 302 and 304 are connected by a voice and data network 306 and an SS7 signaling network 308. When a call is placed, for example, from one user 310 to another user 312, the SS7 signaling network 308 is used to set up the call, and the voice and data network 306 is used to carry the actual voice or data from the users 310 and 312.

Figure 3B:
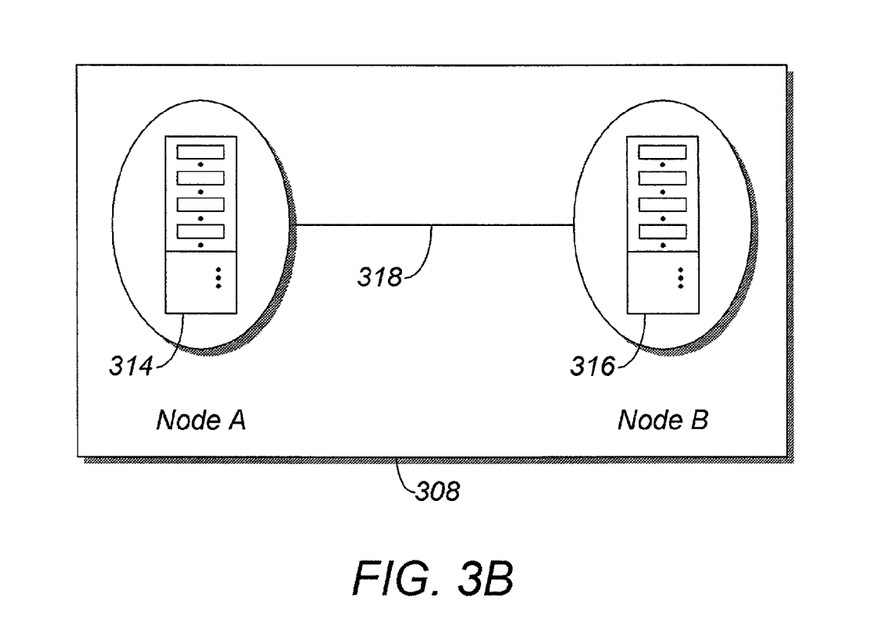

FIG. 3B illustrates a more detailed view of the SS7 signaling network 308. As can be seen, the SS7 signaling network 308 has a plurality of signaling points therein, including Node A and Node B in the illustrated embodiment. The signaling points, Node A and Node B, each include one or more servers 314 and 316, respectively, or other high-end computers or workstations that are capable of processing a large amount of signaling traffic. A signaling link 318, which may be a wired or wireless signaling link, connects the signaling points, Node A and Node B, to one another.

Figure 4:
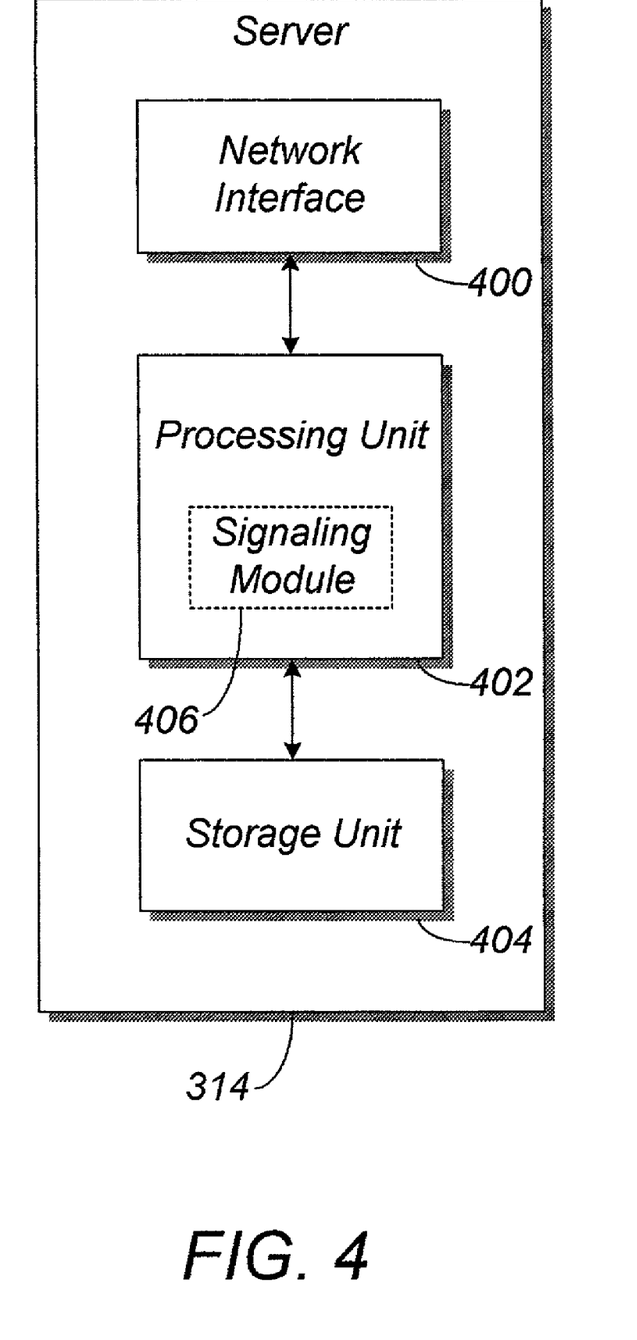
FIG. 4 illustrates a server for an SS7 signaling point according to some embodiments of the invention.

A more detailed view of the server 314 is shown in FIG. 4, where it can be seen that the server 314 has a number of functional components including a network interface 400, a processing unit 402, and a data storage unit 404, all interconnected as shown. The network interface 400 is a typical network interface that allows the server 314 to be connected to the SS7 signaling network 308 via one or more of the signaling links 318 (see FIG. 3). The processing unit 402 is preferably a high-end processing unit that is capable of managing the overall operation of the server 314, including the handling of all signaling traffic received and sent thereby. The storage unit 404 is a typical server storage unit that can store data, software programs, and the like that are needed for the operation of the server 314.

In some embodiments, the processing unit 402 has a signaling module 406 executing thereon. The signaling module 406 allows the server 314 to perform various tasks and operations on the signaling traffic received and sent thereby, including routing analysis and the setting up of TCAP transactions. In particular, the signaling module 406 allows the server 314 to set up semi-permanent TCAP transactions and to make use of connection-oriented SCCP signaling for the TCAP transactions. The signaling module 406 also allows the server 314 to multiplex multiple application dialogues into one TCAP transaction. Alternatively, the signaling module 406 may allow the server 314 to multiplex multiple TCAP transactions in one connection-oriented SCCP connection. The operation of the server 314 in conjunction with the signaling module 406 is described in more detail with respect to FIGS. 5–8.

Figure 5:
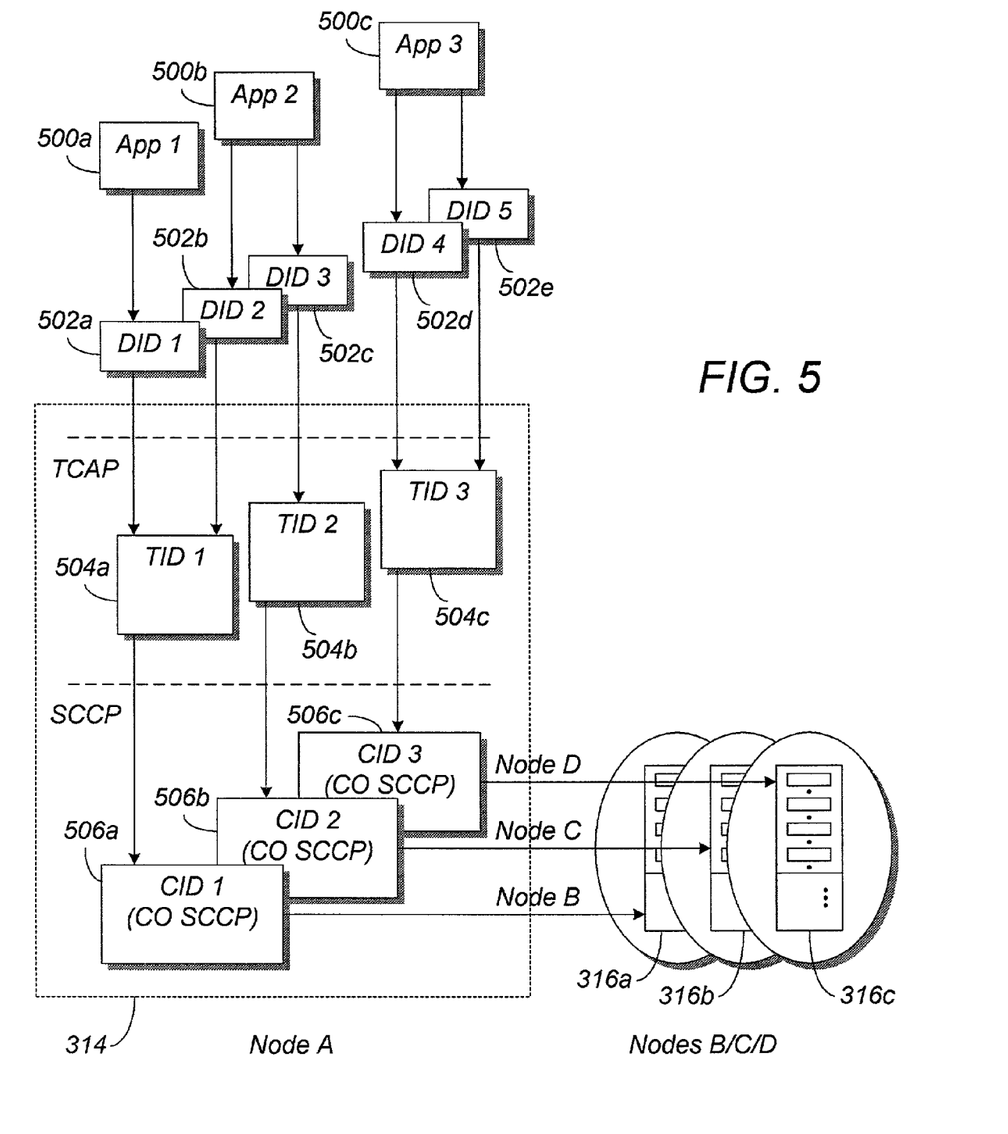
FIG. 5 illustrates a process of setting up a TCAP transaction according to some embodiments of the invention.

FIG. 5 illustrates a functional block diagram of a process of setting up a TCAP transaction within the server 314 at signaling point Node A of the SS7 signaling network 308, according to some embodiments of the invention. As can be seen in FIG. 5, the server 314 has received requests from applications 500a–c to process several application dialogues 502a–e. Specifically, Application 1 has requested processing for DID 1, Application 2 has requested processing for DID 2 and DID 3, and Application 3 has requested processing for DID 4 and DID 5.

In accordance with the principles and teachings of the invention, the server 314 initiates TCAP transactions 504a–c to handle the application dialogues 502a–e. The TCAP transactions 504a–c are set up on a semi-permanent basis, preferably between two signaling points that have a high degree of request-reply communication such as the signaling points Node A and Node B. A semi-permanent TCAP transaction is one that may persist in the signaling network even after the original invoking application dialogue has been processed. Such a semi-permanent transaction allows the server 314 to multiplex multiple application dialogues on to the same TCAP transaction instead of setting up a separate TCAP transaction for each application dialogue. Specifically, the application dialogue messages (not expressly shown here) related to both DID 1 and DID 2 are multiplexed onto TID 1, the application dialogue messages related to DID 2 are sent on TID 2, and the application dialogue messages related to both DID 4 and DID 5 are multiplexed on to TID 3. The semi-permanent TCAP transaction is usually set up and released by an Operations and Maintenance (O&M) personnel using the DPC, a local connection reference (e.g., "Aref") and the TID of the transaction.

The server 314 thereafter uses connection-oriented SCCP connections 506a–c to support the TCAP transactions 504a–c instead of connectionless SCCP connections. Specifically, the TCAP messages (not expressly shown here) related to TID 1, TID 2, and TID 3 are included in SCCP messages (not expressly shown here) related to CID 1, CID 2, and CID 3, respectively. An advantage of using connection-oriented SCCP signaling is that each intermediate signaling point node retains the CID and the DPC. Therefore, global title translation is not needed at the intermediate signaling points, thereby preserving valuable processing resources in the signaling network 308.

Furthermore, the multiplexing arrangement allows a larger number of application dialogues to be supported by the existing number of TCAP transactions, thus improving the efficiency of the TCAP transactions. Moreover, global title translation is performed only once for each TCAP transaction regardless of how many application dialogues actually use the TCAP transaction. Thus, the number of global title translations that need to be performed is reduced.

Figure 6:
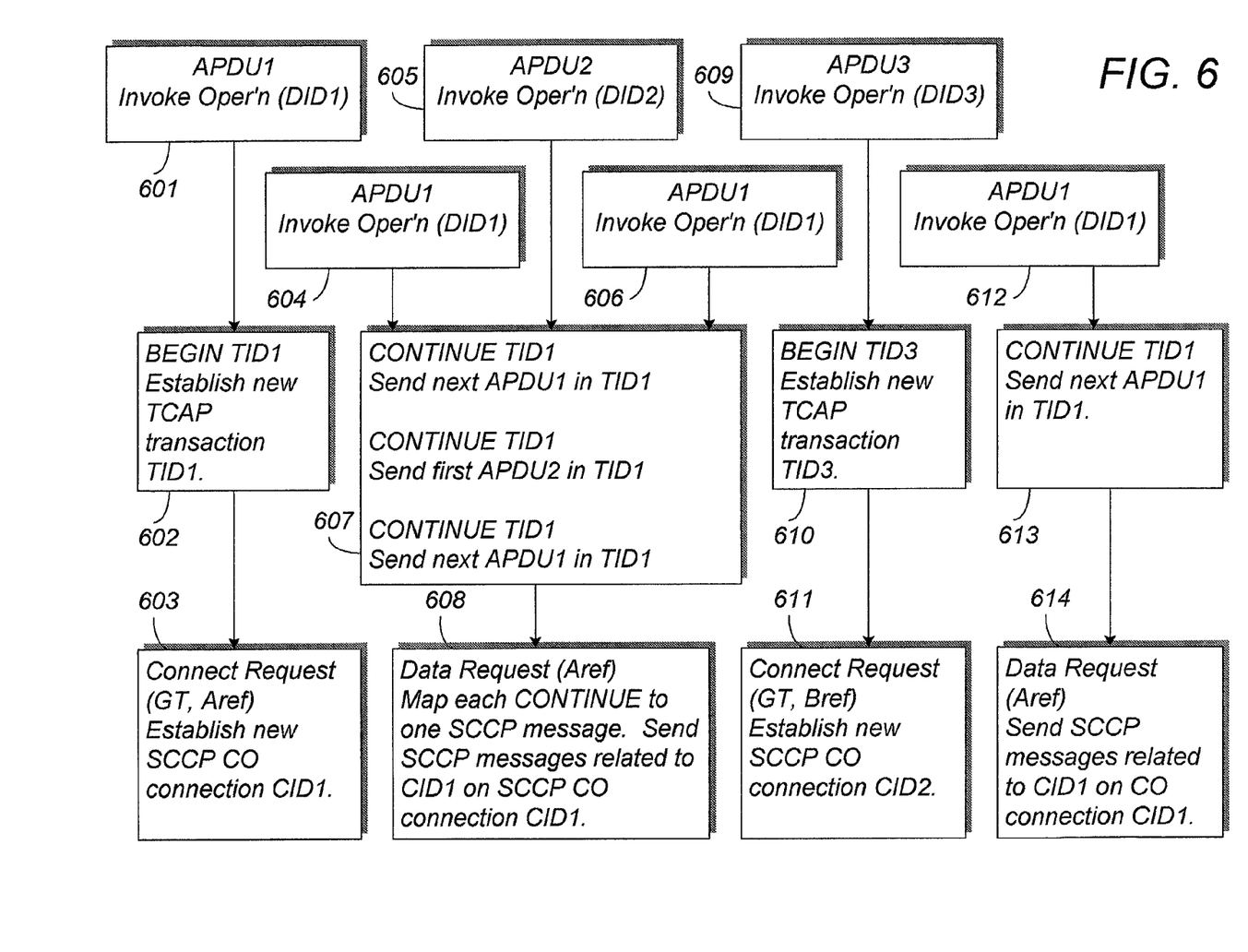
FIG. 6 illustrates a portion of the process of FIG. 5 in more detail according to some embodiments of the invention.

FIG. 6 illustrates a detailed sequence of steps for setting up TCAP transactions TID 1 and TID 2 described above. It should be noted that any specific commands and/or protocols that may be used in the example of FIG. 6 are for illustrative purposes only, and that the invention is not to be limited thereto. It should also be noted that one or more embodiments of the invention may require some reconfiguration of existing SS7 signaling network software and also possibly hardware in order to practice the invention. Any such reconfiguration, however, are well within the knowledge and ability of those persons having ordinary skill in the telecommunications art.

In the existing SS7 protocol, each application dialogue includes at least one application dialogue message that is sometimes called an application protocol data unit (APDU). Each APDU includes an "Invoke" command that specifies the operation to be performed and the DID of the application dialogue. As can be seen in FIG. 6, there are four APDUs being sent for application dialogue DID 1, and one APDU each for application dialogues DID 2 and DID 3. However, the number of APDUs shown for each application dialogue is illustrative only and is not to be construed as limiting.

Progressing from left to right and top to bottom, the reception of the first APDU from application dialogue DID 1 (step 601) triggers the setup of a new, semi-permanent TCAP transaction (step 602) including initiation of global title translation therefor. In particular, the server 314 causes a "Begin" command followed by the transaction identification TID 1 to be issued by the TCAP layer. The server 314 thereafter causes a TCAP protocol data unit (TCAP-PDU) to be sent to the SCCP layer to set up a connection-oriented SCCP connection CID 1 (step 603). The specific commands used by the server 314 may be the "Connect Request" followed by the results of the global title translation (GT) for TID 1 and a local connection reference (e.g., "Aref"). (See, e.g., ITU-T Recommendations Q.771–Q.775 (6/97), X.200 (7/94), X.210 (11/93), and X.220 (3/93).)

Once the TCAP transaction TID 1 is set up, subsequent APDUs can be multiplexed on this TCAP transaction using the "Continue" command followed by the transaction identification TID 1. In this example, a second and third APDU are received from application dialogue DID 1 (steps 604 and 606), and a first APDU is received from application dialogue DID 2 (step 605). These APDUs are all multiplexed on TCAP transaction TID 1 (step 607) using the "Continue" command. The server 314 thereafter causes a "Data Request" command followed by the local connection reference (e.g., "Aref") to be issued by the SCCP layer to indicate that a TCAP-PDU is about to be sent on the already established connection-oriented SCCP connection CID 1 (step 608). At the SCCP layer, each TCAP-PDU that includes a "Continue" command followed by TID 1 is mapped in one SCCP message, and all SCCP messages related to CID 1 are sent on the same, already established connection-oriented SCCP connection CID 1.

Referring still to FIG. 6, reception of the first APDU from application dialogue DID 3 (step 609) causes the server 314 to set up another, semi-permanent TCAP transaction (step 610) including initiation of global title translation therefor. The TCAP transaction in this case may be set up to the same destination signaling point as the transaction TID 1, or it may be to a different destination signaling. Where the destination signaling point is the same, a TCAP transaction TID 2 parallel to transaction TID 1 may be set up using the same DPC (i.e., global title translation may be avoided), but with a different SCCP connection. The server 314 thereafter causes a "Connect Request" command followed by the results of global title translation and a local connection reference Bref to be sent to the SCCP layer (step 611) to set up the new connection-oriented SCCP connection CID 2.

Reception of a fourth APDU from application dialogue DID 1 (step 612) is shown here to emphasize that all APDUs related to application dialogue DID 1 will be sent on the TCAP transaction TID 1 (step 613) and SCCP connection CID 1 (step 614) that are already set up.

Figure 7:
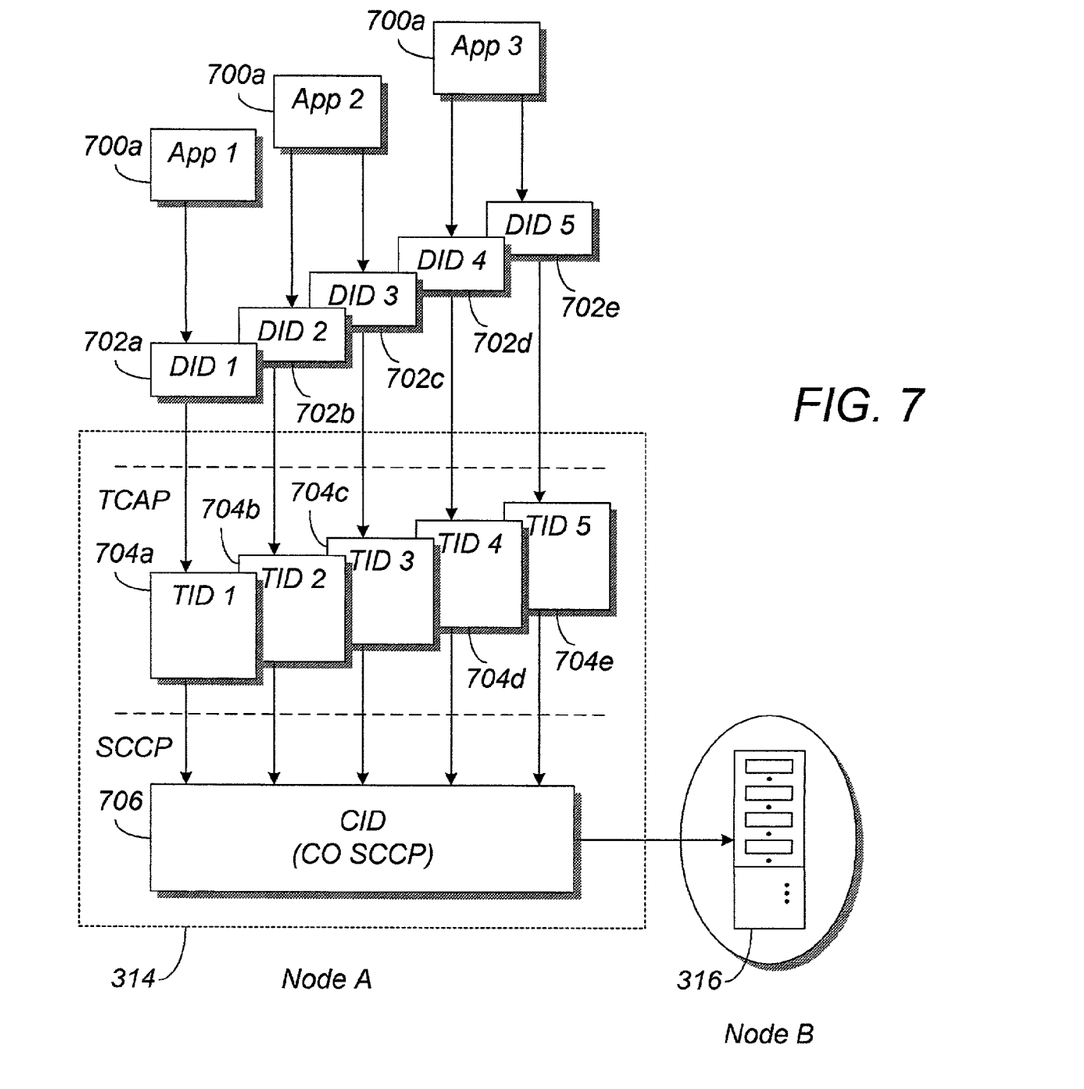
FIG. 7 illustrates another process of setting up a TCAP transaction according to some embodiments of the invention.

Turning now to FIG. 7, a functional block diagram of another process of setting up a TCAP transaction according to some embodiments of the invention is shown. In the process of FIG. 7, each application dialogue 702a–e is mapped to one TCAP transaction 704a–e. Thus, DID 1, DID 2, DID 3, DID 4, and DID 5 are mapped on to TID 1, TID 2, TID 3, TID 4, and TID 5, respectively. However, in addition to using connection-oriented SCCP signaling, the server 314 multiplexes two or more TCAP transactions 704a–e onto one connection-oriented SCCP connection 706. More specifically, each TCAP-PDU for TIDs 1–5 are mapped on to one of the SCCP messages for the connection-oriented SCCP connection 706.

For each application dialogue 702a–e received, the server 314 makes a decision to set up a new TCAP transaction or use an already established TCAP transaction. The server 314 also decides if a new SCCP connection is to be set up or an already established SCCP connection will be used. In the example of FIG. 7, the decisions are based in part on whether the same two signaling points, Node A and Node B, are involved in the TCAP transactions.

Figure 8:
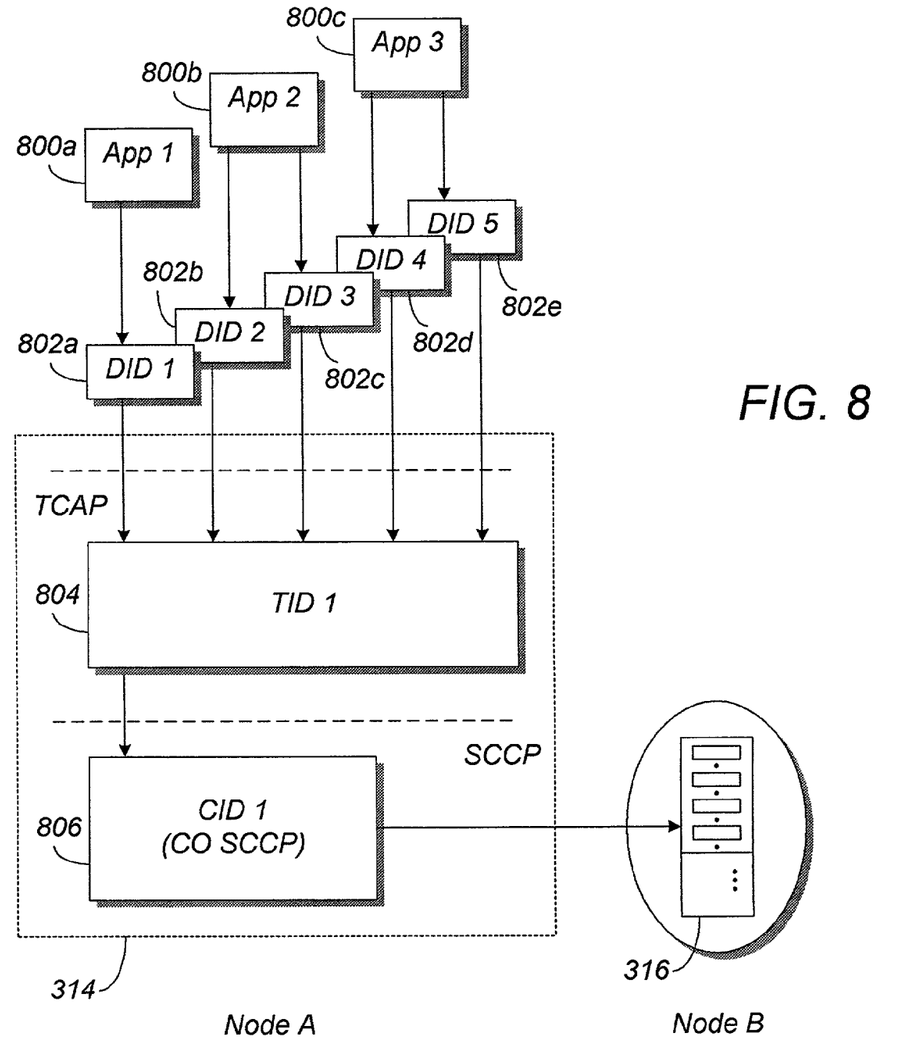
FIG. 8 illustrates still another process of setting up a TCAP transaction according to some embodiments of the invention.

FIG. 8 illustrates a functional block diagram of still another process of setting up a TCAP transaction according to some embodiments of the invention. The process of FIG. 8 is similar to the process of FIG. 6 except that the applications 800a–c and application dialogues 802a–e resulting therefrom all use the same TCAP transaction 804. Thus, in addition to using connection-oriented SCCP signaling, the server 314 multiplexes the application dialogues 802a–e onto one TCAP transaction 804. Specifically, DID 1, DID 2, DID 3, DID 4, and DID 5 are all multiplexed on to TID 1. In this way, the number of application dialogues per TCAP transaction that can be made available to concurrent applications may be increased. The TCAP transaction 804 is thereafter included as part of a connection-oriented SCCP message related to a connection-oriented SCCP connection 806 to be sent to the receiving signaling point, Node B.

In the above embodiments, for the case where there is no multiplexing of application dialogues on TCAP transactions or multiplexing of TCAP transactions on SCCP connections, the CID of the connection-oriented SCCP connection may be used to identify the TCAP transaction, that is to say, the TID is implicitly given by the CID. Thus, at the receiving signaling point, Node B, the server 314 only needs to process the DID of the application dialogues in order to extract both the TCAP transactions and the application dialogues. In this way, the amount of processing power needed in the SS7 signaling network 308 for routing analysis may be reduced.

As demonstrated by the foregoing, embodiments of the invention provide a method and system for improving the efficiency of TCAP transactions. Advantages of the invention include increased availability of application dialogues for concurrent applications, and decreased consumption of processing resources in the network for routing analysis. The invention is especially useful for wireless applications protocol (WAP) traffic and for instant messaging traffic where there is an extensive need to interrogate the HLR for location information, terminal status, pre-paid charging information, and other similar information over TCAP dialogues using the MAP protocol.

While a limited number of embodiments have been disclosed herein, those of ordinary skill in the art will recognize that variations and modifications from the described embodiments may be derived without departing from the scope of the invention. For example, while embodiments of the invention have been described with respect to mobile communications systems, the invention is not to be limited thereto and may be applied to any telecommunications system. Accordingly, the appended claims are intended to cover all such variations and modifications as falling within the scope of the invention.

What is claimed is:

1. A method of setting up a Transaction Capabilities Application Part (TCAP) transaction in an SS7 signaling network, the method comprising the steps of:
   receiving multiple application dialogues in said SS7 signaling network;
   establishing at least one TCAP transaction in said SS7 signaling network;
   multiplexing said multiple application dialogues in said at least one TCAP transaction; and
   transporting said at least one TCAP transaction in said SS7 signaling network using a connection-oriented Signaling Connection Control Part (SCCP) connection.

2. The method according to claim 1, wherein said step of establishing a TCAP transaction includes establishing a semi-permanent TCAP transaction.

3. The method according to claim 1, wherein said multiple application dialogues are based on a Mobile Applications Part protocol.

4. The method according to claim 1, wherein a plurality of TCAP transactions are multiplexed onto one SCCP connection.

5. The method according to claim 4, wherein TCAP transactions comprising one TCAP message and each TCAP message comprising an application dialog are multiplexed onto one SCCP connection.

6. The method according to claim 1, wherein each TCAP transaction comprises multiple TCAP messages, each TCAP message including an application dialogue protocol data unit therein.

7. The method according to claim 1, further comprising performing one global title translation for each TCAP transaction.

8. The method according to claim 1, wherein application dialogues having different identifications are multiplexed onto one TCAP transaction.

9. A server for setting up a Transaction Capabilities Application Part (TCAP) transaction in an SS7 signaling network, comprising:

a storage unit configured to store a signaling module thereon; and a processing unit connected to said storage unit and configured to execute said signaling module, said signaling module causing said server to:
   receive multiple application dialogues from said SS7 signaling network;
   establish at least one TCAP transaction in said SS7 signaling network;
   multiplex said multiple application dialogues in said at least one TCAP transaction; and
   transport said at least one TOAP transaction in said SS7 signaling network using a connection-oriented Signaling Connection Control Part (SCCP) connection.

10. The server according to claim 9, wherein at least one TCAP transaction established by said server includes a semi-permanent TCAP transaction.

11. The server according to claim 9, wherein said multiple application dialogues are based on a Mobile Applications Part protocol.

12. The server according to claim 9, wherein said signaling module causes said server to multiplex a plurality of TCAP transaction onto one SCCP connection.

13. The server according to claim 12, wherein said signaling module causes said server to multiplex TCAP transactions onto one SCCP connection, wherein each TCAP transaction comprises one TCAP message and each TCAP message comprises an application dialog.

14. The server according to claim 9, wherein each TCAP transaction comprises multiple TCAP messages, each TCAP message including an application dialogue protocol data unit therein.

15. The server according to claim 9, wherein said signaling module causes said server to perform one global title translation for each TCAP transaction.

16. The server according to claim 9, wherein said signaling module causes said server to multiplex application dialogues having different identifications onto one TCAP transaction.

* * * * *